(12) United States Patent
Summer

(10) Patent No.: US 7,229,585 B2
(45) Date of Patent: Jun. 12, 2007

(54) MOLDED PLASTIC ROD WITH IMPROVED BREAK STRENGTH

(75) Inventor: Mark J. Summer, Frankfort, IL (US)

(73) Assignee: Illinois Tool Works Inc., Glenview, IL (US)

( * ) Notice: Subject to any disclaimer, the term of this patent is extended or adjusted under 35 U.S.C. 154(b) by 325 days.

(21) Appl. No.: 10/624,268

(22) Filed: Jul. 22, 2003

(65) Prior Publication Data

US 2004/0126552 A1 Jul. 1, 2004

Related U.S. Application Data

(60) Provisional application No. 60/411,603, filed on Sep. 18, 2002.

(51) Int. Cl.
*D29B 7/00* (2006.01)
*B29C 45/00* (2006.01)
*G01N 9/00* (2006.01)

(52) U.S. Cl. .............................. 264/328.9; 264/328.1; 73/453; 73/451; 73/447

(58) Field of Classification Search ................. None
See application file for complete search history.

(56) References Cited

U.S. PATENT DOCUMENTS

| 4,363,329 | A | * | 12/1982 | Raitto | 600/578 |
| 5,180,643 | A | * | 1/1993 | Nedbal | 429/91 |
| 5,350,367 | A | * | 9/1994 | Stiehl et al. | 604/232 |
| 6,393,910 | B1 | | 5/2002 | Korb et al. | 73/447 |
| 6,494,866 | B1 | * | 12/2002 | Robinson | 604/228 |

* cited by examiner

*Primary Examiner*—Michael C. Miggins
(74) *Attorney, Agent, or Firm*—Mark W. Croll; Paul F. Donovan

(57) ABSTRACT

An injection molded plastic rod suitable for use in a battery hydrometer. Stress-relieving formations are provided symmetrically arranged on opposite sides of an injection gate of the rod. The formations distribute injection stresses and shield the gate vestige.

21 Claims, 1 Drawing Sheet

MOLDED PLASTIC ROD WITH IMPROVED BREAK STRENGTH

CROSS-REFERENCE TO RELATED APPLICATIONS

The present regular U.S. Patent Application claims the benefits of U.S. Provisional Patent Application Ser. No. 60/411,603, filed Sep. 18, 2002.

FIELD OF THE INVENTION

The present invention relates generally to molded plastic rods and, more particularly, the present invention relates to molded plastic rods used in battery hydrometers.

BACKGROUND OF THE INVENTION

Simple plastic rods are used in many devices and apparatuses. One use for molded plastic rods is in battery hydrometers. An elongated transparent plastic rod extends downwardly from the top of the battery into one or more cells of the battery. The rod has attached thereto a cage that encloses or suspends one or more spherical balls within the battery fluid. The hydrometer can monitor both the battery fluid level and the specific gravity of the battery fluid. Incident light rays are transmitted through the transparent rod, and various patterns or colors are transmitted to the viewing surface of the rod on the outer top level of the battery. The patterns or colors indicate whether or not the rod is immersed in battery fluid, indicating the battery fluid level, and whether or not the ball of a predetermined specific gravity is buoyant within the battery fluid, indicating the specific gravity of the fluid. An example of such a cage for suspending balls within the battery fluid can be found in U.S. Pat. No. 6,393,910 "One Piece Battery Charge Indicator Cage," which is commonly assigned herewith.

It is known that the plastic rod by which the cage is suspended in the battery can be manufactured by injection molding processes. It has been observed that such injection-molded rods are susceptible to inborn stresses that are concentrated at the injection point. The concentration of inborn stresses at the injection point weakens the overall strength of the rod, resulting in much reduced overall break strength. The concentration of stresses in a relatively small area can cause cracks to form easily, which can then propagate quickly. As a result, prior rods have been known to break during shipment or installation, and a cracked or weakened rod may even fail during use.

Another problem with known rods of this type is that a sharp point or edge may be developed at the injection point (gate), with residual material (gate vestige) extending above the surface of the rod. A sharp or pointed gate vestige has the potential of damaging any product or item that comes in contact with it. Removing the sharp point or edge involves a subsequent process to the molding process, which can be time consuming and may significantly increase the cost for the rod.

What is needed in the art is an improved injection process and rod design whereby the overall strength of an injection molded rod is increased, particularly at the injection point, and in which the sharp edge or point that may remain after injection molding is shielded from contact with other items or things.

SUMMARY OF THE INVENTION

The present invention provides stress-relieving formations located symmetrically adjacent to the injection point of the plastic rod, to reduce inborn stresses and shield the gate vestige.

In one aspect thereof, the present invention provides a molded plastic rod with a barrel having an injection site along the length thereof; and an injection stress relieving formation in said barrel adjacent said injection site.

In another aspect thereof, the present invention provides a molded plastic rod for a hydrometer of a storage battery with a barrel of light transmissive plastic having a cone shaped tip at one end thereof and an indicating surface at an opposite end thereof, with an injection site along a length thereof. First and second stress-relieving formations are arranged symmetrically on opposite sides of the injection site.

In still another aspect thereof, the present invention provides a method of making a plastic rod for a storage battery hydrometer with steps of providing a mold having an elongated barrel-forming portion and an injection gate along the barrel-forming portion; providing a pocket in the mold adjacent the injection gate; and injecting plastic into the mold through the injection gate and flowing the plastic into the pocket as injection of plastic into the mold is completed.

An advantage of the present invention is providing an injection-molded rod of increased overall strength.

Another advantage of the present invention is providing a plastic rod with improved lateral break strength at the injection point on any length of injection molded rod rod.

Still another advantage of the present invention is providing an injection molded plastic rod in which a sharp edge or point, if any, remaining at the injection molding site is shielded from contact with other items and things.

A further advantage of the present invention is providing an injection-molded rod that is less susceptible to cracking or breaking during shipment, installation and use.

Other features and advantages of the invention will become apparent to those skilled in the art upon review of the following detailed description, claims and drawings in which like numerals are used to designate like features.

Figure 1:
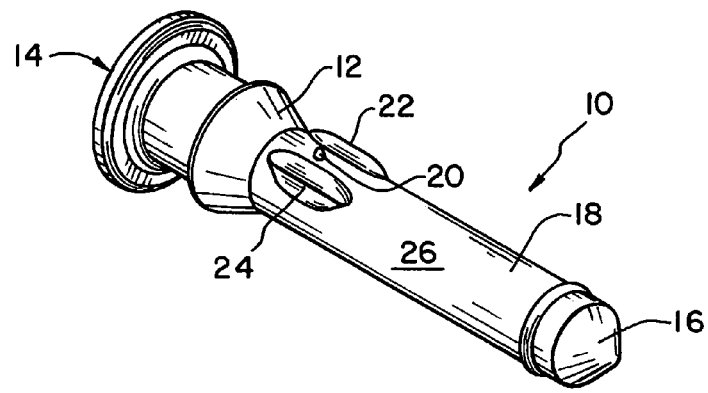
FIG. 1 is a perspective view of a injection molded rod used as a battery hydrometer in accordance with the present invention.
Figure 2:
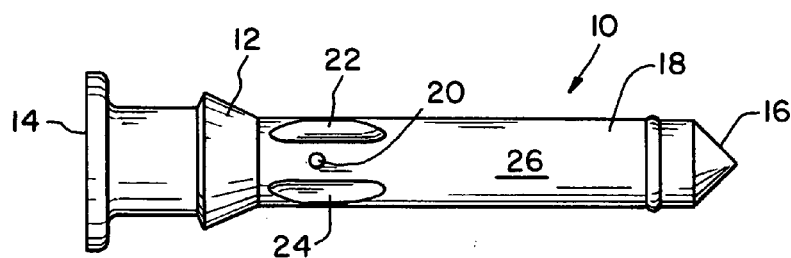
FIG. 2 is an elevational view of the rod shown in FIG. 1.
Figure 3:
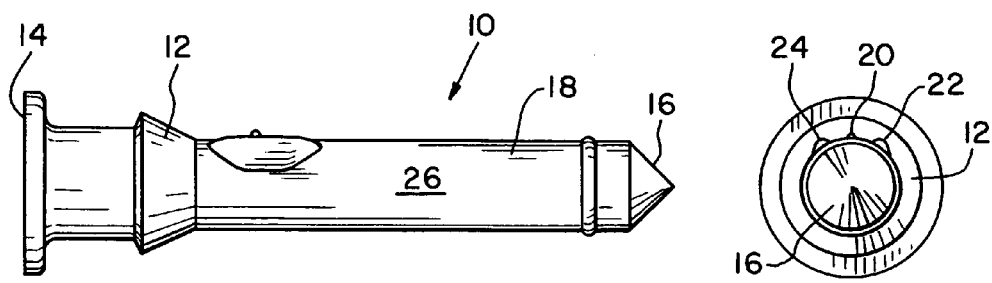
FIG. 3 is an elevational view of similar to that of FIG. 2 but with the rod rotated about its longitudinal axis compared to FIG. 2.
Figure 4:
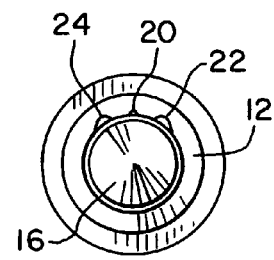
FIG. 4 is an end view of the rod shown in FIG. 3.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including" and "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates an injection molded plastic rod in accordance with the present invention. The exemplary rod 10 shown and described herein is a rod adapted for use in a battery hydrometer. The present invention is of particular advantage when used for the plastic rod of a battery hydrometer; however; it should be understood that the present invention can be used advantageously also in other applications and devices as well.

Rod 10 is a light transmissive rod made of light transmitting material, such as, for example, acrylic, styrene or other clear or partially clear material. Plastic rods of the present invention used for other, non-light transmissive applications can be made of other materials. The present invention works well with a variety of different injection-molded plastic materials, both light transmissive and non-light transmissive.

Exemplary rod 10 further includes a collar 12 and an indicating surface 14. Collar 12 is sized and adapted for insertion into a preformed bore defining an opening or hole in a storage battery (not shown) in which the present exemplary rod 10 is used. Collar 12 is adapted to fit snugly within the preformed bore of the battery (not shown) so as to create a fluid tight seal therewith. Rod 10 is elongated such that it extends a substantial distance into the battery. When mounted in the fluid vessel of the battery (not shown), the upper end or indicating surface 14 of rod 10 is at or near the outer surface of the battery. An inner end of rod 10 is connected to a cage or chamber (not shown) immersed in battery fluid of a properly filled battery.

Rod 10 includes a light-reflecting, cone-shaped tip 16 at the end of a barrel 18 arranged to be submerged within the liquid in the battery of a properly filled battery. As is well known to those skilled in the art, a float member (not shown) is moveable relative to reflecting tip 16 for indicating the relative specific gravity of the liquid. The manner in which rod 10 is operatively incorporated within a storage battery hydrometer assembly is well-known to those skilled in the art and will not be described in further detail herein.

It is well known to those skilled in the art how a conventional rod can be formed by an injection molding process in which plastic material is injected into a mold at a location intermediate the length of the rod. A small tip or nob of material may remain at the injection site and is commonly referred to as the gate vestige. In the drawings, the gate vestige of rod 10 is indicated by numeral 20.

It is known that inborn stresses are created at or near the gate vestige during the injection molding process. As the mold is filled during the injection process, it is important that voids in the material be eliminated. During the final moments of filling, as the material is packed in and around the injection gate, it is necessary to force the material in under high pressure, to ensure complete packing and the absence of voids. As a result of the high packing pressure shear stresses are introduced and concentrated in and around the injection gate. The inborn stresses that are concentrated in a small area tend to create a weakened condition which can lead to cracks or other failure at the injection site. Once a small fracture occurs, it can propagate along the rod quickly and easily. Packaging, shipping, installation and handling can result in crack propagation and rod failure. Failure can occur even after the rod is installed.

It has been found that the stresses from final injection packing are relieved or more widely distributed if rod 10 includes enlargements in the way of surface formations or projections 22, 24 spaced from but near the injection gate. In the embodiment illustrated, formations 22 and 24 are in the form of elongated surface projections on the otherwise smooth barrel surface 26 of rod 10. Stress relieving formations 22 and 24 are located symmetrically adjacent to the injection point or gate indicated by gate vestige 20. In one embodiment, formations 22 and 24 extend from the location of the gate at a minimum incline of one degree to the injection plane of rod 10. In a further aspect, formations 22, 24 end at a maximum angle of 90 degrees to the tangent of the gate indicated by gate vestige 20. Preferably, the formations are tapered at each end thereof, and extend along the longitudinal axis of the rod. The tapered surface minimizes undesirable stress risers in the material.

The present invention addresses the problem of inborn stresses of the injection-molded rod by relieving the molding stresses through redirecting plastic flow as final packing occurs. An injection mold having a conventional barrel-forming portion with an injection gate therein is also provided with pockets adjacent the gate for forming projections 22 and 24. As injection filling of the mold is being completed, the pockets on opposite sides of and adjacent the injection gate are the last areas of the mold to fill, and projections 22 and 24 formed therein provide an enlarged area around the gate in which the injection stresses may form. As a result, the final injection stresses from high-pressure packing of the mold are more widely distributed, and the stresses are not concentrated in a small area at the injection gate. By reducing the concentration of stresses, the break-strength of the rod is increased. Further, the stresses are from the barrel of the rod 10 to projections provided on the barrel. The barrel has a consistent structure throughout its length, and any stresses in the projections do not affect the strength of the barrel as significantly as stresses in the barrel itself.

Another feature of the projections 22 and 24 is that they provide additional physical strength to the rod 10. When a force is applied to the rod 10, say, for example, opposite the gate 20, the force tends to be absorbed by the outer most portions of the rod 10, i.e., the projections 22 and 24. In this way, the projections 22 and 24 protect the rod 10 from cracking or, if slightly cracked, from allowing the force to propagate the crack.

While the exemplary embodiment shows elongated surface projections 22 and 24, other shapes for stress-relieving projections 22 and 24 are also effective in distributing the final injection stresses. The elongated projections 22 and 24 are exemplary of a suitable shape known to work well. Advantages may be obtained from use of a single stress-relieving projection; however, the use of symmetrically positioned projections on opposite sides of the injection gate provides an even flow of the injected plastic and a more even distribution of stresses.

It has been experienced that an excessive gate vestige 20, which can be tapered to a relatively sharp, needle-like pointed end, can cause damage to items and things which it comes in contact with. The needle-like tip of gate vestige 20 can puncture or scratch people or things. It can scratch or otherwise damage other rods 10 that are packaged in bulk therewith. It is, of course, possible to remove excessive gate vestige 20 subsequent to the molding process. However, removal of excessive gate vestige 20 requires a separate subsequent step that complicates and extends the manufacturing process, increasing the manufacturing cost.

A further advantage of the preferred embodiment of the present invention is that formations 22 and 24 are on opposite sides of and immediately adjacent gate vestige 20, and rise from barrel surface 26 to provide a blocking or shielding arrangement around gate vestige 20. Advantageously, projections 22 and 24 are sufficiently high above barrel surface 26 to meet a line tangent to the tip of gate vestige 20. Thus, people, articles or things coming into contact with barrel surface 26 are protected from gate vestige 20 by the adjacent formations 22, 24. Only articles and things sufficiently small and properly aligned to fit between formations 22 and 24 can come in contact with gate vestige 20.

The present invention provides an improved plastic rod manufactured by injection molding. By distributing stresses from the injection process, the overall strength and performance of the rod are improved. Less waste occurs from fewer rejected or failed parts, and supply costs are decreased. By shielding the gate vestige, the potentially for ancillary damage to things coming into contact with the rod is reduced.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A method of making and using a plastic rod for a storage battery hydrometer, said method comprising steps of;
   providing a storage battery having an opening;
   providing a mold having an elongated, substantially cylindrical barrel-forming portion and an injection gate along the barrel-forming portion;
   providing a pocket in the mold adjacent the injection gate;
   injecting plastic into the mold through the injection gate and flowing the plastic into the pocket as injection of plastic into the mold is completed, thereby forming said rod into a substantially, cylindrical solid piece of material with an injection stress relieving formation formed from the plastic inserted into the pocket of the mold; and
   inserting said rod into said opening in said storage battery.

2. The method of claim 1 including providing two pockets symmetrically arranged on opposite sides of the injection gate, and flowing plastic into said pockets as injection of plastic into the mold is completed.

3. The method of claim 1 wherein said rod has an injection site on a cylindrical surface of said rod for the injection molding process along the length thereof and wherein said injection stress relieving formation in said rod is adjacent said injection site.

4. The method of claim 3 including first and second injection stress relieving formations on opposite sides of said injection site.

5. The method of claim 4 wherein said first and second injection stress relieving formations are outward projections from the surface of said rod.

6. The method of claim 5 wherein said first and second injection stress relieving projections are elongated along the length of the rod.

7. The method of claim 6 wherein said first and second elongated stress-relieving projections have tapered ends.

8. The method of claim 7 wherein said projections are provided at a minimum incline of one degree.

9. The method of claim 7 wherein said projections end at a maximum angle of 90 degrees to a tangent of said injection site.

10. The method of claim 9 wherein said projections are provided at a minimum incline of one degree.

11. The method of claim 10 wherein said plastic is light transmissive.

12. The method of claim 1 wherein said plastic is light transmissive.

13. The method of claim 12 wherein said plastic is acrylic.

14. The method of claim 1 wherein said rod is made of light transmissive plastic having a cone shaped tip at one end thereof and an indicating surface at an opposite end thereof with a injection site for the injection molding process along a length thereof, and wherein first and second injection stress relieving formations are arranged symmetrically on opposite sides of said injection site.

15. The method of claim 14 wherein said first and second stress relieving formations are projections from the surface of said rod.

16. The method of claim 15 wherein said plastic is acrylic.

17. The method of claim 15 wherein said projections are elongated along a length of said rod.

18. The method of claim 17 wherein said elongated projections have tapered ends.

19. The method of claim 14 wherein said first and second stress relieving formations are projections extending from a surface of said rod at a minimum incline of one degree.

20. The method of claim 14 wherein said first and second stress relieving formations are projections from a surface of said rod ending at a maximum angle of 90 degrees to a tangent of said injection site.

21. The method of claim 20 wherein said projections extend at a minimum incline of one degree.

* * * * *